United States Patent
Abuelsaad et al.

(12) 
(10) Patent No.: US 10,635,087 B2
(45) Date of Patent: Apr. 28, 2020

(54) DYNAMIC 3D PRINTING-BASED MANUFACTURING

(71) Applicant: International Business Machines Corporation, Armonk, NY (US)

(72) Inventors: Tamer E. Abuelsaad, Armonk, NY (US); Gregory J. Boss, Saginaw, MI (US); John E. Moore, Jr., Pflugerville, TX (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/602,639

(22) Filed: May 23, 2017

(65) Prior Publication Data
US 2018/0341247 A1    Nov. 29, 2018

(51) Int. Cl.
*G05B 19/00* (2006.01)
*G05B 19/4099* (2006.01)
*G06Q 10/08* (2012.01)

(52) U.S. Cl.
CPC ....... *G05B 19/4099* (2013.01); *G06Q 10/083* (2013.01); *G05B 2219/49023* (2013.01)

(58) Field of Classification Search
CPC ...... G05B 19/4099; G05B 2219/49023; G05B 2219/49007; G05B 2219/31389; G05B 19/41865; G06Q 10/083; G06Q 10/00
See application file for complete search history.

(56) References Cited

U.S. PATENT DOCUMENTS 8,504,485 B1 * 8/2013 Wenneman .......... G06Q 10/083
                                                                 705/338
9,229,674 B2   1/2016 Tapley et al.
(Continued)

FOREIGN PATENT DOCUMENTS

WO       2014190168 A1    11/2014

OTHER PUBLICATIONS

Website "How to 3D Print", https://www.3dhubs.com/how-to-3d-print, captured by Wayback machine archive Mar. 2016 at https://web.archive.org/web/20160316212915/https://www.3dhubs.com/how-to-3d-print (Year: 2016).*

(Continued)

*Primary Examiner* — Michael D Masinick
(74) *Attorney, Agent, or Firm* — Brian J. Kim; Christopher K. McLane; Randy E. Tejeda

(57) ABSTRACT

In an approach to dynamic manufacturing, one or more computer processors receive an indication of intent to purchase a product. The one or more computer processors identify a set of specifications associated with the product. The one or more computer processors determine required product specification parameters based on the one or more product specifications. The one or more computer processors identify three dimensional printing-based manufacturers within a threshold proximity to a delivery location of the product. The one or more computer processors determine whether the identified three dimensional printing-based manufacturers can create the product meeting the determined required product specification parameters. The one or more computer processors send a list of three dimensional printing-based manufacturers that can create the product.

17 Claims, 5 Drawing Sheets

(56) References Cited

U.S. PATENT DOCUMENTS

| | | | |
|---|---|---|---|
| 9,533,526 | B1 | 1/2017 | Nevins |
| 9,857,187 | B2* | 1/2018 | Profous .............. G01C 21/3446 |
| 2007/0038323 | A1* | 2/2007 | Slocum ................ G06Q 10/087 |
| | | | 700/99 |
| 2013/0179067 | A1* | 7/2013 | Trowbridge ....... G01C 21/3484 |
| | | | 701/410 |
| 2014/0277669 | A1* | 9/2014 | Nardi ................... G05B 19/042 |
| | | | 700/103 |
| 2015/0039375 | A1* | 2/2015 | Grichnik .......... G06Q 10/06313 |
| | | | 705/7.23 |
| 2015/0096266 | A1 | 4/2015 | Divine et al. |
| 2016/0042321 | A1* | 2/2016 | Held ................ G06Q 10/08355 |
| | | | 705/338 |
| 2016/0237804 | A1* | 8/2016 | Papadimitriou .... E21B 47/0006 |
| 2017/0016732 | A1* | 1/2017 | Ashton ................ G06F 16/322 |
| 2017/0173888 | A1 | 6/2017 | Thomas-Lepore et al. |
| 2017/0186071 | A1 | 6/2017 | Dodd |
| 2018/0341249 | A1* | 11/2018 | Abuelsaad ......... G05B 19/4099 |

OTHER PUBLICATIONS

Appendix P, List of IBM Patents or Patent Applications Treated as Related, 2 pages, dated Jan. 17, 2018.

Abuelsaad et al., "Dynamic 3D Printing-Based Manufacturing", U.S. Appl. No. 15/849,067, filed Dec. 20, 2017, 36 pages.

Manners-Bell et al., "The Implications of 3D Printing for the Global Logistics Industry", Supply Chain 24/7, Jan. 23, 2014, <http://www.supplychain247.com/article/the_implications_of_3d_printing_for_the_global_logistics_industry>, © 2017 SupplyChain247.com is owned and produced by Peerless Media, LLC., a Division of EH Publishing, Inc. All rights reserved, 10 pages.

"Determining Trusted Individuals for Groupings of Item Shipment through Utilization of Social Networks and Location Data", An IP.com Prior Art Database Technical Disclosure, Authors et al.: IBM, Original Publication Date: Dec. 21, 2009, IP.com No. IPCOM000191211D, IP.com Electronic Publication Date: Dec. 21, 2009, 3 pages.

"Smart shared printing system to avoid unnecessary printing", An IP.com Prior Art Database Technical Disclosure, Authors et al.: Disclosed Anonymously, IP.com No. IPCOM000218263D, IP.com Electronic Publication Date: May 30, 2012, 5 pages.

"A technique to allow consumers to quickly determine the legitimacy of a single or a group of items purchased through POS or Online ordering systems", An IP.com Prior Art Database Technical Disclosure, Authors et al.: Disclosed Anonymously, IP.com No. IPCOM000235864D, IP.com Electronic Publication Date: Mar. 28, 2014, 5 pages.

"Local 3D printing", Find a 3D printing service and get your parts in 48 hours, © 2017 3D Hubs, printed on May 23, 2017, <https://www.3dhubs.com/>, 2 pages.

"Thingiverse", Digital Designs for Physical Objects, Customizable Creations, printed on May 23, 2017, 3 pages, <https://www.thingiverse.com/>.

Mell et al., "The NIST Definition of Cloud Computing", Recommendations of the National Institute of Standards and Technology, NIST Special Publication 800-145, Computer Security Division Information Technology Laboratory, National Institute of Standards and Technology, Gaithersburg, MD 20899-8930, Sep. 2011, 7 pages.

* cited by examiner

DYNAMIC 3D PRINTING-BASED MANUFACTURING

BACKGROUND OF THE INVENTION

The present invention relates generally to the field of manufacturing, and more particularly to analytics-based manufacturing.

Three-dimensional (3D) printing is a process used to create 3D objects by adding layers of material to form the 3D object using a computer controlled additive process. 3D printing can create objects of almost any shape or geometry depending on the 3D printing techniques and manufacturing devices employed. 3D printing processes may include binger jetting, directed energy deposition, material extrusion, material jetting, powder bed fusion, sheet lamination, and vat photopolymerization. 3D printable models may be created by computer aided design, a 3D scanner, and/or by digital cameras coupled to photogrammetry software.

SUMMARY

Embodiments of the present invention disclose a method, a computer program product, and a system for dynamic manufacturing. The method may include one or more computer processors receiving an indication of intent to purchase a product. The one or more computer processors identify a set of specifications associated with the product. The one or more computer processors determine required product specification parameters based on the one or more product specifications. The one or more computer processors identify three dimensional printing-based manufacturers within a threshold proximity to a delivery location of the product. The one or more computer processors determine whether the identified three dimensional printing-based manufacturers can create the product meeting the determined required product specification parameters. The one or more computer processors send a list of three dimensional printing-based manufacturers that can create the product.

DETAILED DESCRIPTION

Figure 1:
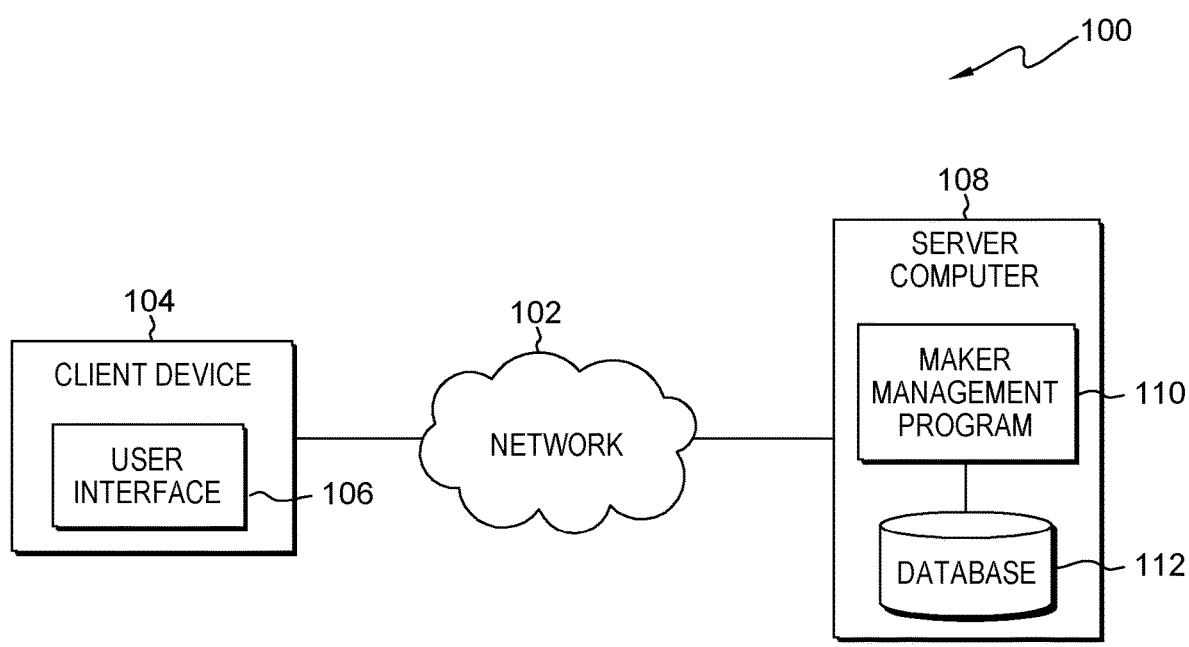
FIG. 1 is a functional block diagram illustrating a distributed data processing environment, in accordance with an embodiment of the present invention.

The present day prevalence and rapid expansion of the capabilities of computing devices and manufacturing methods allows for manufacturing to take place locally without the need, inconvenience, and costs associated with conventional manufacturing and delivery methods. Present day methods of manufacturing and distribution of goods are limited to particular channels of commerce that require substantial investments in time and energy and offer limited options, such as conventional online marketplaces. Embodiments of the present invention recognized that manufacturing technologies have advanced to a point where conventional channels of commerce limit the options, prices, shipping options, and many other parameters that may be available to the public through the coupling of 3D printing-based manufacturing.

As such, the streamlining of manufacturing tasks based on the particular needs of a user can benefit from the dynamic allocation of three-dimensional (3D) printing resources that previously had to be manufactured elsewhere using the expanded capabilities of modern computing devices. Further, the application of dynamic resource allocation to 3D printing-based manufacturing can dramatically decrease waste in resources and time associated with conventional manufacturing and distribution operations by localizing manufacturing based on the location of a user. For example, purchasing an item from a local 3D printing-based manufacturer may reduce transportation costs by reducing packaging waste associated with protecting items on longer shipping routes, quickening shipping times, reducing fuel costs, and allowing more orders to be fulfilled per day.

By applying dynamic resource allocation to manufacturing tasks, an improved user experience allowing user-tailored manufacturing tasks carried out by local manufacturers is possible. For example, the production of products, such as replacement parts for appliances, can be created and delivered by a 3D printer within a closer vicinity to a user thereby reducing shipping costs and time as well as providing a user with additional options for manufacturing tasks. As a result, a maker management program can facilitate a connection between one or more users and one or more 3D printer owners to create a channel for efficient communication and tailored 3D manufacturing based on the required specifications, monetary resources, proximity to one or more 3D printers, manufacturing processes, and any other parameter associated with a manufacturing request. Embodiments of the present invention recognize that utilizing dynamic resource allocation improves the efficacy of product manufacturing and distribution by better managing a supply and demand ecosystem through the intelligent decentralization of manufacturing processes based on user-specific parameters.

Analytics involves the discovery, interpretation, and communication of patterns in data. Analytics using various techniques, such as statistics, computer programming, and multiple criteria decision analysis, allows for functional improvements in various technological disciplines, such as manufacturing. Further, the application of analytics to manufacturing allows for the flexibility and adaptation in three dimensional printer-based manufacturing by allowing products to be tailored to particular needs based on a multitude of variables, such as shipping times, prices, and material options. By efficiently sifting through complex sets of data to find patterns most closely matching the desired outcomes, analytics applied to the field of three dimensional printer-based manufacturing can vastly improve the manufacturing process in various ways, such as reducing waste, creating application-specific products, reducing costs, reducing manufacturing times, and reducing shipping times. Implementation of embodiments of the invention may take a variety of forms, and exemplary implementation details are discussed subsequently with reference to the Figures.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client device 104 and server computer 108, and other devices (not shown) within distributed data processing environment 100.

Client device 104 can be any programmable electronic computing device capable of communicating with various components and devices, such as a laptop computer, a tablet computer, or a smart phone, within distributed data processing environment 100, via network 102. In general, client device 104 represents any programmable electronic device or combination of programmable electronic devices capable of executing machine readable program instructions, manipulating executable machine readable instructions, collecting sensor data, and communicating with server computer 108 and other client devices (not shown) within distributed data processing environment 100 via a network, such as network 102.

User interface 106, hosted on client device 104, provides an interface to maker management program 110 on server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. For example, user interface 106 may be a function associated with an online market place that displays competitive local 3D printing prices during the checkout process to allow a user to opt for a locally 3D printed product at a cheaper price. In another embodiment, user interface 106 may also be mobile application software that provides an interface between a user of client device 104 and server computer 108. Mobile application software, or an "app," is a computer program designed to run on smart phones, tablet computers and other mobile devices. User interface 106 may enable the user of client device 104 to register with and configure maker management program 110 to adjust preferences for maker management functions. However, user interface 106 is not limited to the aforementioned examples and may be used to control any parameters, such as required product specification parameters, associated with maker management program 110.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any other programmable electronic device capable of communicating with client device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes maker management program 110 and database 112. Server computer 108 may include internal and external hardware components, as depicted and described in further detail with respect to FIG. 3.

Maker management program 110 initiates after a maker, such as a parts manufacturer, registers with maker management program 110. Registration may include any information relevant to the manufacturing capabilities of a maker. For example, a 3D printing-based parts manufacturer may upload the physical specifications of all the products the manufacturer can produce, the types of materials available to the manufacturer, the location of the manufacturer, the pricing information for labor and parts, and the shipping options available to a customer upon ordering a 3D printed part. Maker management program 110 receives maker registration data, such as location, manufacturing capabilities, shipping capabilities, product quality, raw materials used, standard deviation from specifications, etc. Following the receipt of maker registration data, maker management program 110 stores the maker registration data. For example, maker management program 110 may store the maker registration data on a database, such as database 112.

In a detailed example, maker management program 110 receives a fabrication request for 3D printed fabrication from one or more users of maker management program 110. A fabrication request may include various fabrication parameters, such as the item to be fabricated, desired fabrication materials, a desired shipping time, and a maximum cost to a user. Maker management program 110 determines whether maker management program 110 can retrieve fabrication data associated with the fabrication request. Responsive to determining that maker management program 110 cannot retrieve the fabrication data associated with the fabrication request, maker management program 110 ends. Responsive to determining that maker management program 110 can retrieve the fabrication data associated with the fabrication request, maker management program 110 determines whether one or more local makers are capable of fulfilling the fabrication request. Responsive to determining that one or more makers are incapable of fulfilling the fabrication request, maker management program 110 ends.

Furthering the example, responsive to determining that one or more makers are capable of fulfilling the fabrication request, maker management program 110 sends the fabrication request to the one or more local makers. Maker management program 110 receives one or more fabrication quotes. Maker management program 110 sends the one or more fabrication quotes to a customer. Maker management program 110 receives an order confirmation. Maker management program 110 sends the order to a selected one or more makers. Maker management program 110 is depicted and described in further detail with respect to FIG. 2.

Database 112 is a repository for data used and stored by maker management program 110. In the depicted embodiment, database 112 resides on server computer 108. In another embodiment, database 112 may reside elsewhere within distributed data processing environment 100 provided maker management program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 may store user interaction data, product data, product feature data, failure reports, and any other relevant data associated with a client device, such as client device 104. Database 112 also stores data and required product specification parameters, such as maximum allowable fabrication costs, shipping preferences, and manufacturing preferences, inputted by a user of client device 104 for the purpose of controlling how maker management program 110 narrows down the makers capable of fulfilling a fabrication request. Database 112 may also store data associated with the historical order data, user preferences, maker registration, previous fabrication quotes, and fabrication data.

Figure 2:
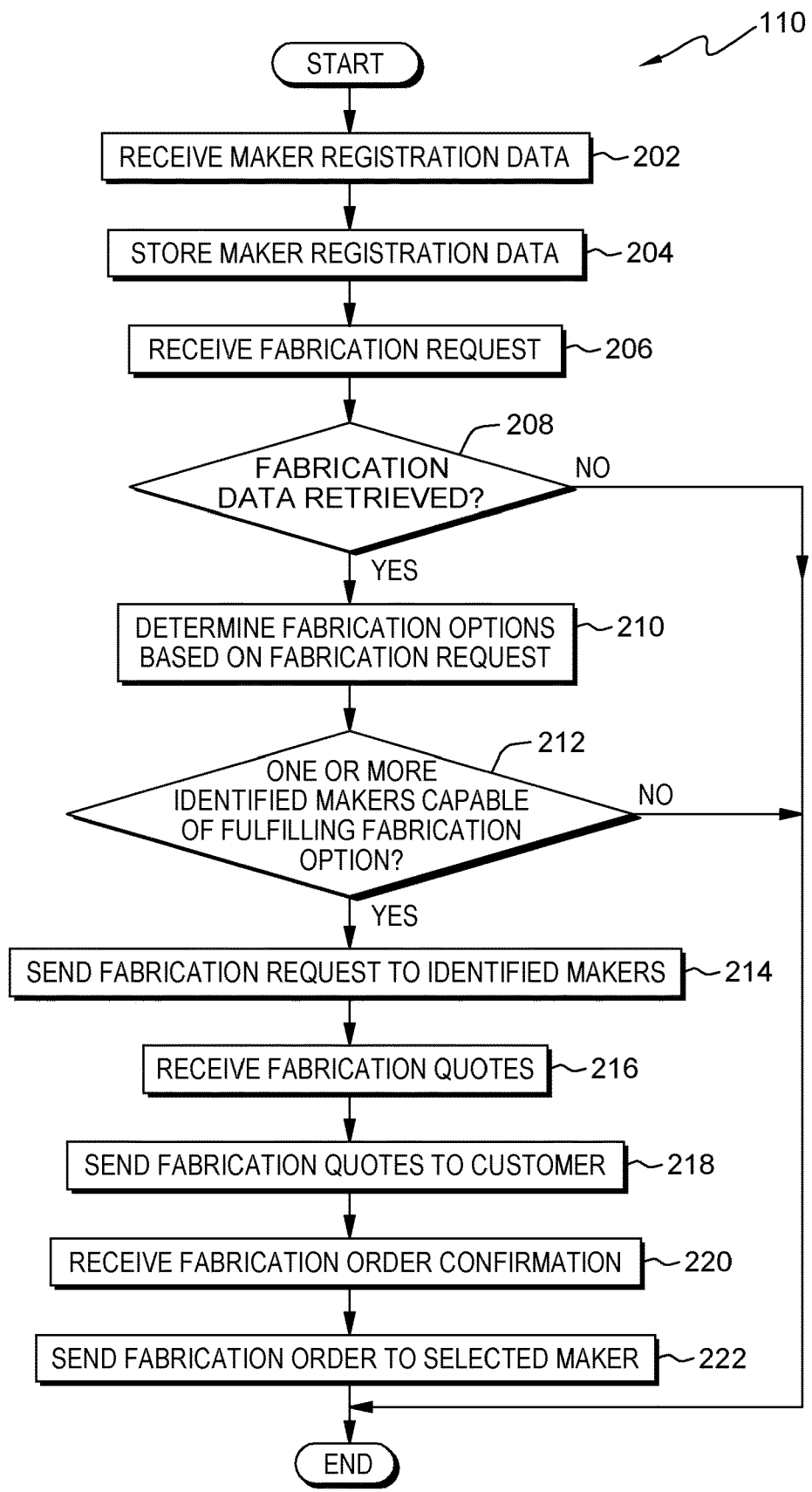
FIG. 2 is a flowchart depicting operational steps of a maker management program, on a server computer within the distributed data processing environment of FIG. 1, for determining three-dimensional printing resources, in accordance with an embodiment of the present invention.

FIG. 2 is a flowchart depicting operational steps of maker management program 110, on server computer 108 within distributed data processing environment 100 of FIG. 1, a program for allocating three-dimensional printing resources to location dependent manufacturing tasks based on the specification and materials needed to fabricate a product based on expected uses and physical tolerances, in accordance with an embodiment of the present invention. Maker management program 110 starts after a maker registers with maker management program 110 by providing data, such as a maker location, one or more fabrication capabilities of the maker, one or more shipping options, and pricing information. Maker management program 110 continues to run until maker management program 110 sends one or more orders to one or more selected makers detailing one or more fabrication requests.

Maker management program 110 receives maker registration data (step 202). Maker registration data may include any data associated with a maker. For example, maker registration data may include one or more locations of the maker, one or more types of fabrication equipment available to the maker, one or more shipping capabilities of the maker, and pricing information based upon the aforementioned variables or other variables not mentioned. The types of fabrication equipment may be any 3D printing equipment type, such as fused deposition modeling, stereolithography, digital light processing, selective laser sintering, selective laser melting, electron beam melting, laminated object manufacturing, binder jetting, and material jetting. Pricing information may be any information related to the fabrication costs associated with particular 3D printing technology, such as material costs, time costs, and labor costs.

In an embodiment, maker registration data may be automatically populated by maker management program 110 from internet sources, such as maker community forums and online 3D printing services. In another embodiment, maker registration data may be directly received from a maker. For example, a 3D printing company may input the 3D printing company's address, prices, fabrication equipment information, and contact information directly into a web user interface to be stored in a database associated with maker management program 110. However, maker registration data may be received by maker management program 110 in any manner available in the art and is not limited to the embodiments discussed herein.

Maker management program 110 stores maker registration data (step 204). In one embodiment, maker management program 110 may store maker registration data in database 112. For example, maker management program 110 may store maker registration data in a solid state drive (SSD) in a laptop computer owned by an individual. In another example, maker management program 110 may store maker registration data in a database on a server computer, such as server computer 108, to be later sent to one or more requesting client devices over the internet. In another embodiment, maker management program 110 may not store maker registration data and may instead retrieve maker registration data from an external source such as an industry database for 3D printing based businesses. For example, maker management program 110 may retrieve maker information from online communities with directories listing makers registered with the community. In another example, maker management program 110 may retrieve maker information by performing searches of public databases, such as search engines, to retrieve maker registration data and store the maker registration data on a database. In an alternative embodiment, maker management program 110 may not store maker registration data and may perform a search of one or more databases and search engines upon receiving a fabrication request. For example, maker management program 110 may retrieve maker registration data associated with a request to print a copper door knob by performing a search on a search engine shortly after receiving a fabrication request, as discussed in more detail in the discussion of step 206. However, maker management program 110 is not limited to storing maker registration data in database 112 and may store maker registration data in any retrievable format. In some embodiments, maker management program 110 may not store any information, rather maker management program 110 may request information upon receiving a fabrication request.

Maker management program 110 receives one or more fabrication requests from a customer (step 206). A fabrication request may include specifications associated with a fabricated part, such as a requested shipping time, a requested method of 3D printing, a maximum 3D printing cost, a maximum distance of one or more makers from the customer, and fabrication data associated with the request. Additionally, fabrication requests may also include indications of intent to purchase a product from a user. Fabrication requests may also include required product specification parameters, such as a maximum tolerable deviation or minimum material strength. For example, a fabrication request for a bottle cap may include the details directly associated with the bottle cap as well as require the bottle cap to be deviate less than one millimeter from the bottle cap's specifications and satisfy a minimum force per unit area of tensile strength. In another example, a fabrication request for a plate may include the details directly associated with the plate as well as require the plate to be printed from Bisphenol-A (BPA) free plastics. In yet another example, a fabrication request for a specialty screw for use in racing wheels may include the details directly associated with the specialty screw and well as require the specialty screw to withstand a minimum amount of shearing stress before fracturing. However, fabrication requests may include any information relevant to the 3D printing process and are not limited by the embodiments discussed herein.

In one embodiment, maker management program 110 may receive a fabrication request from a customer using user interface 106 on client device 104. For example, a user may use a smartphone to open a web-based program to purchase particular products available from a 3D printing database tied to an online marketplace. In another embodiment, maker management program 110 may receive a fabrication request from a customer using user interface 106 on client device 104 and associated fabrication data. For example, a user may upload fabrication data for a custom project and send the fabrication data and the fabrication request using an app on a smartphone.

In yet another embodiment, maker management program 110 may receive a fabrication request from a customer via an online marketplace. For example, an online marketplace may advertise a mass-produced version of a product, such as a smart phone case, created by a large-scale manufacturer and also advertise alternative 3D printed options and associated prices, such as a higher price for higher quality 3D printed versions or a lower price for similar quality versions of a product, depending on the specification of the product and whether manufacturing options achieving the specifications exist.

In yet another embodiment, maker management program 110 may receive multiple fabrication requests associated with one or more products. For example, maker management program 110 may receive a fabrication request for a smart phone case made from acrylonitrile butadiene styrene (ABS) plastic using fused deposition modeling (FDM) and another fabrication request for a replacement aluminum back plate for the smart phone using selective laser melting (SLM). However, a fabrication request is not limited to the aforementioned embodiments and may include any information relevant to the fabrication of one or more items.

Maker management program 110 determines whether maker management program 110 can retrieve fabrication data associated with the fabrication request (decision block 208). Fabrication data may include any data associated with the fabrication of the requested product. For example, fabrication data may include the 3D blueprint of the requested product, the type of 3D printing employed for the requested product, the details surrounding the 3D printing process, such as curing times for particular materials, light intensity for light based processes, dots per inch for layering processes, and layer thickness. In one embodiment, maker management program 110 retrieves fabrication data submitted by a manufacturer directly from database 112. For example, a smart phone parts manufacturer may upload specifications for 3D models of the individual parts in a cellphone to as part of uploading maker registration data to maker management program 110 for retrieval upon receiving a fabrication request. In another embodiment, maker management program 110 may retrieve fabrication data from external sources. For example, maker management program 110 may retrieve fabrication data for a replacement cap for a water bottle from a manufacturer database made available through network 102 to maker management program 110. In another example, maker management program 110 may retrieve fabrication data for a replacement cap for a water bottle from an online community that makes custom-made fabrication data. In another example, maker management program 110 may receive fabrication data from a maker community forum where users submit custom specifications and 3D blueprints for custom-made game pieces for board games.

Responsive to determining that maker management program 110 cannot retrieve the fabrication data associated with the fabrication request ("No" branch, decision block 208), maker management program 110 ends. In an alternative embodiment, maker management program 110 does not end but returns to step 206 to receive a subsequent fabrication request. For example, maker management program 110 may receive a subsequent fabrication request on a queue of fabrication requests by any entity owning a 3D printer, such as a 3D printer resourcing company or an individual owning a 3D printer. In another alternative embodiment, maker management program 110 does not end but returns to step 202 to receive a subsequent set of maker registration data. For example, maker management program 110 may receive a subsequent set of maker registration data from a queue to process after being unable to retrieve the fabrication data associated with the previous fabrication request.

Responsive to determining that maker management program 110 can retrieve the fabrication data associated with the fabrication request ("Yes" branch, decision block 208), maker management program 110 determines one or more fabrication options based on the fabrication request (step 210). Fabrication options may be limited by the details of the fabrication requests. Fabrication requests may also include the expected uses of a product. The expected uses of a product may serve as additional fabrication parameters based on the product specifications required to achieve the expected use. Maker management program 110 may apply cognitive computing to generate product specifications that most closely create a product that achieves the expected uses of the product. In one example, maker management program 110 may be limited in fabrication options by a minimum tensile strength and maximum tolerable deviation from original specifications previously input by a user in a fabrication request. In one embodiment, maker management program 110 accesses database 112 to determine which 3D printing materials and processes most closely satisfy the fabrication request. For example, maker management program 110 may access 3D printing data, such as data on a company database that contains brands of 3D printers, permissible applications of particular materials, locations of 3D printing businesses, and respective capabilities of the 3D printers. By applying the fabrication request details to the 3D printing data, maker management program 110 may weigh one or more options to narrow down one or more fabrication options, such as one or more combinations of materials, product dimensions, and 3D printing processes that best satisfy the fabrication request using cognitive computing. For example, maker management program 110 may employ a multiple-criteria decision analysis using machine-learning algorithms, such as a statistical analysis, analytic hierarchy process, analytic network process, and value analysis. However, maker management may weigh the one or more options to narrow down one or more fabrication options using any method known in the art.

In another example, maker management program 110 may access a shared pool of resources through network 102, such as a cloud computing network, to determine which 3D materials and processes most closely satisfy the fabrication request. For example, maker management program 110 may access a cloud network of computers associated with a maker organization to utilize the cloud computing processing power and access the databases in the network to determine the 3D materials and processes that most closely satisfy the fabrication request.

In yet another embodiment, maker management program 110 may execute a material failure analysis using one or more algorithms to determine one or more materials and product specifications meeting one or more required product specification parameters based on the intended uses of the product. For example, maker management program 110 may execute a material failure analysis using algorithms calculating the points of microscopic failure, such as fracture mechanics algorithms, and the points of macroscopic failure, such as stress failure, energy type failure, damage failure, and empirical failure algorithms, for four wheels intended to support a 2,000-pound object.

Maker management program 110 may determine fabrication options using any available method and is not limited to the embodiments discussed herein. In one example, maker management program 110 may use cognitive computing, such as predictive analytics, artificial intelligence, and machine learning, to mine data, determine one or more possible options, weigh the one or more options, and determine one or more viable options.

Maker management program 110 determines whether one or more identified makers are capable of fulfilling the one or more fabrication options (decision block 212). Determining whether one or more identified makers are capable of fulfilling the one or more fabrication options may consider a variety of factors, such as maker availability, maker manufacturing capabilities, product turn-around time, maker location, maker performance metrics (e.g., rate of product returns), and customer reviews. Maker management program 110 may use a multiple-criteria decision analysis (MCDA) to weigh possible methods of production, types of materials, levels of deviation from the original product specifications, price points, manufacturing times, and any other criteria related to 3D printer-based manufacturing. Based on the results of the MCDA, maker management program 110 may determine the best options for fulfilling the one or more fabrication options. For example, maker management program 110 may determine that there are three 3D manufacturing options falling within two percent of the price of the original product that exceed the specifications of the product and two 3D manufacturing options meeting the specifications and price of the product with a faster shipping time than the original product.

In another embodiment, maker management program 110 may use a time-dependent route planning algorithm to determine a threshold proximity to a delivery location of the product from the user. A time-dependent algorithm determines travel speeds for one or more routes from an origin to a destination to find one or more 3D printing-based manufacturers that fall within a delivery time frame most closely meeting the fabrication request. In another embodiment, maker management program 110 may use a stochastic time-dependent route planning algorithm to determine a threshold proximity to a delivery location of the product from the user. A stochastic time-dependent algorithm weighs time-dependent and stochastic influences on travel speeds for one or more routes from an origin to a destination to find one or more 3D printing-based manufacturers that fall within a delivery time frame most closely meeting the fabrication request.

In one embodiment, maker management program 110 may determine which makers are capable of manufacturing the one or more fabrication options. For example, maker management program 110 may compile a simple list of all the makers capable of fulfilling the one or more fabrication options. In another embodiment, maker management program 110 may use cognitive computing to determine one or more makers that can best satisfy the fabrication request. For example, maker management program 110 may user cognitive computing to mine the customer review data, returns data, and average shipping times of a maker and compile a list of makers ranked from the best match to the worst match. However, maker management program 110 is not limited to the embodiments disclosed herein and may determine whether one or more identified makers are capable of fulfilling the one or more fabrication options using any method.

Responsive to determining that one or more makers are incapable of fulfilling the fabrication option ("No" branch, decision block 212), maker management program 110 ends.

Responsive to determining that one or more makers are capable of fulfilling the fabrication option ("Yes" branch, decision block 212), maker management program 110 sends the fabrication request to the one or more identified makers (step 214). In one embodiment, maker management program 110 sends one or more fabrication requests associated with one or more fabrication options through a web-based application over network 102. For example, maker management program 110 may send a fabrication request for a widget made of aluminum using selective laser melting (SLM) through a website connected to maker management program 110 over the internet. In another embodiment, maker management program 110 sends one or more fabrication requests associated with one or more fabrication options through a graphical user interface (GUI) on a computer program over network 102. For example, maker management program 110 may send a fabrication request for a widget made of ABS plastic using fused deposition modeling (FDM) through a smartphone app connected to maker management program 110 over the internet. In an alternative embodiment, maker management program 110 may not send the fabrication request to the one or more makers if maker management program 110 sent a fabrication request for an identical or substantially similar product, such as a difference in the color of plastic, in a prior instance. Maker management program 110 is not limited to the embodiments disclosed herein and may send the fabrication request to one or more identified makers using any available method.

Maker management program 110 receives one or more fabrication quotes (step 216). Fabrication quotes may include any amount of compensation requested in return for fulfillment of the fabrication request. Fabrication quotes may also include the 3D printing technique, the materials, the shipping method, and the shipping time. In one embodiment, maker management program 110 may receive one or more fabrication quotes from every identified maker. Identified makers may include large commercial manufacturers, smaller regional manufacturer, and individuals. In another embodiment, maker management program 110 may receive one or more fabrications quotes from fewer than every identified maker. For example, maker management program may receive fabrication quotes for a 1,000 copper doorknobs from less than every identified maker because some makers may decline to avoid exceeding the maximum output of the makers' facilities. In an alternative embodiment, maker management program 110 may not receive a fabrication quote to the one or more makers if maker management program 110 received a fabrication quote for an identical or substantially similar product, such as a difference in the color of plastic, in a prior instance. Maker management program 110 may receive one or more fabrication quotes associated with one or more fabrication options over network 102.

Maker management program 110 sends the one or more fabrication quotes to a customer (step 218). Maker management program 110 may send the one or more fabrication quotes in real-time or substantially real-time, such as sending the one or more fabrication quotes within three milliseconds of receiving the one or more fabrication quotes. For example, maker management program 110 may send the one or more fabrication quotes to be displayed on a web user interface on an online marketplace next to the price of the original product. In one embodiment, maker management program 110 sends the one or more fabrication quotes to a requester through a web-based application over network 102. For example, maker management program 110 may send the one or more fabrication quotes for a widget made of aluminum using selective laser melting (SLM) through a website connected to maker management program 110 over the internet. In another embodiment, maker management program 110 sends one or more fabrication quotes to a requester through a graphical user interface (GUI) on a computer program over network 102. For example, maker management program 110 may send the one or more fabrication quotes for a widget made of ABS plastic using fused deposition modeling (FDM) through a smartphone app connected to maker management program 110 over the internet. Maker management program 110 is not limited to the embodiments disclosed herein and may send the one or more fabrication quotes to one or more requesters using any available method.

Maker management program 110 receives an order confirmation (step 220). In an embodiment, maker management program 110 may receive one or more order confirmations from a requester. In another embodiment, maker management program 110 may not receive an order confirmation from a requester.

Maker management program 110 sends a fabrication order to a selected one or more makers (step 222). A fabrication order may include the specifics of the fabrication requests, such as a selected fabrication option, the type of material used, the type of 3D printing technology used, the shipping options, and the deadline for fulfilling the fabrication order. However, a fabrication order is not limited to the embodiments discussed herein and may include any details associated with a fabrication request. In one embodiment, maker management program 110 sends one or more fabrication orders to a selected maker through a web-based application over network 102. In another embodiment, maker management program 110 sends one or more fabrication orders to a selected maker through a graphical user interface (GUI) on a computer program over network 102. In an alternative embodiment, maker management program 110 may return to step 206 to receive a subsequent fabrication request. For example, maker management program 110 may receive another fabrication request from a queue of fabrication requests shortly after sending a fabrication order to a selected maker.

Figure 3:
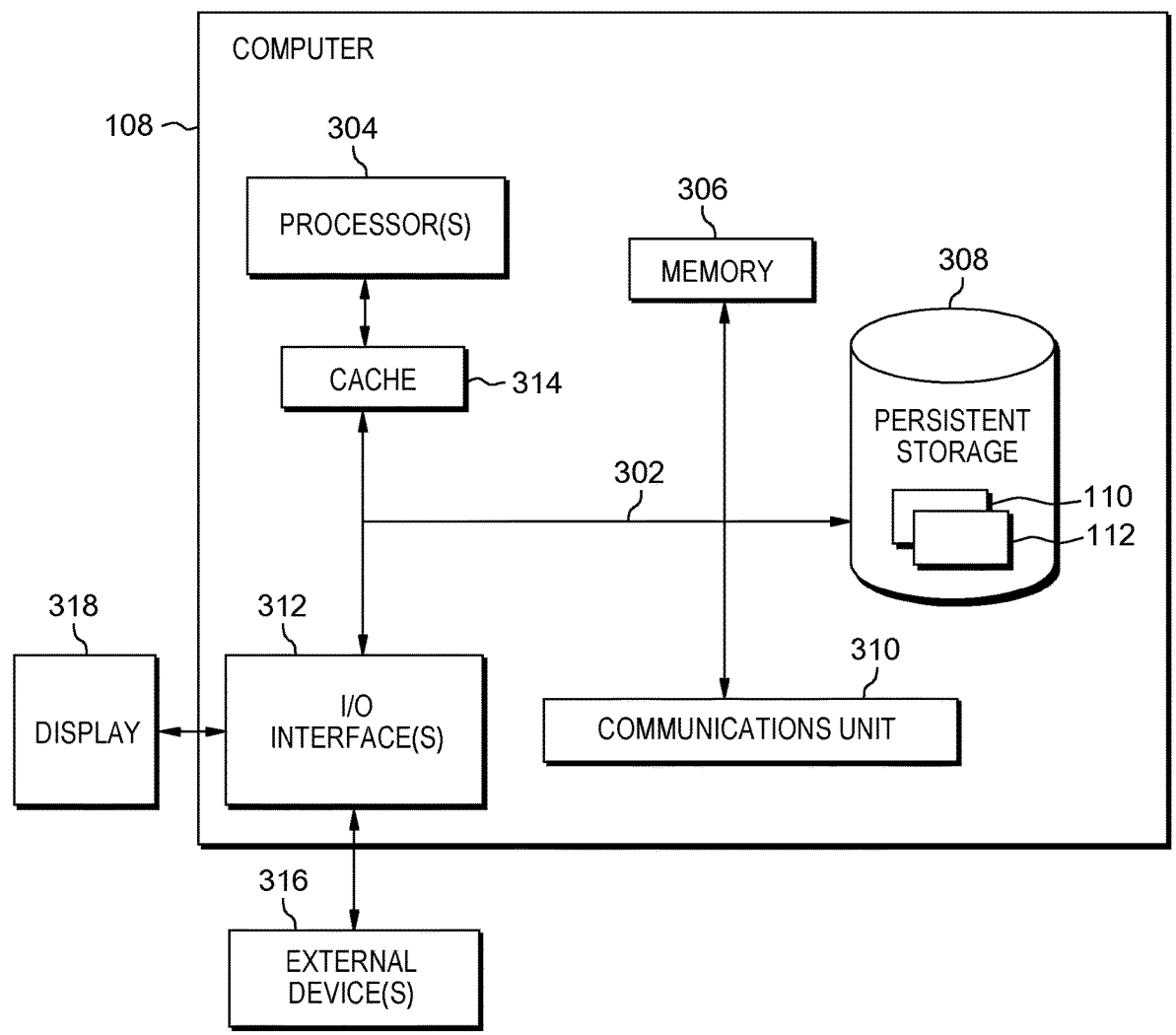
FIG. 3 depicts a block diagram of components of the server computer executing the maker management program within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., maker management program 110 and database 112, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client device 104. In these examples, communications unit 310 includes one or more network interface cards. Communications unit 310 may provide communications through the use of either or both physical and wireless communications links. Maker management program 110, database 112, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., maker management program 110 and database 112 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
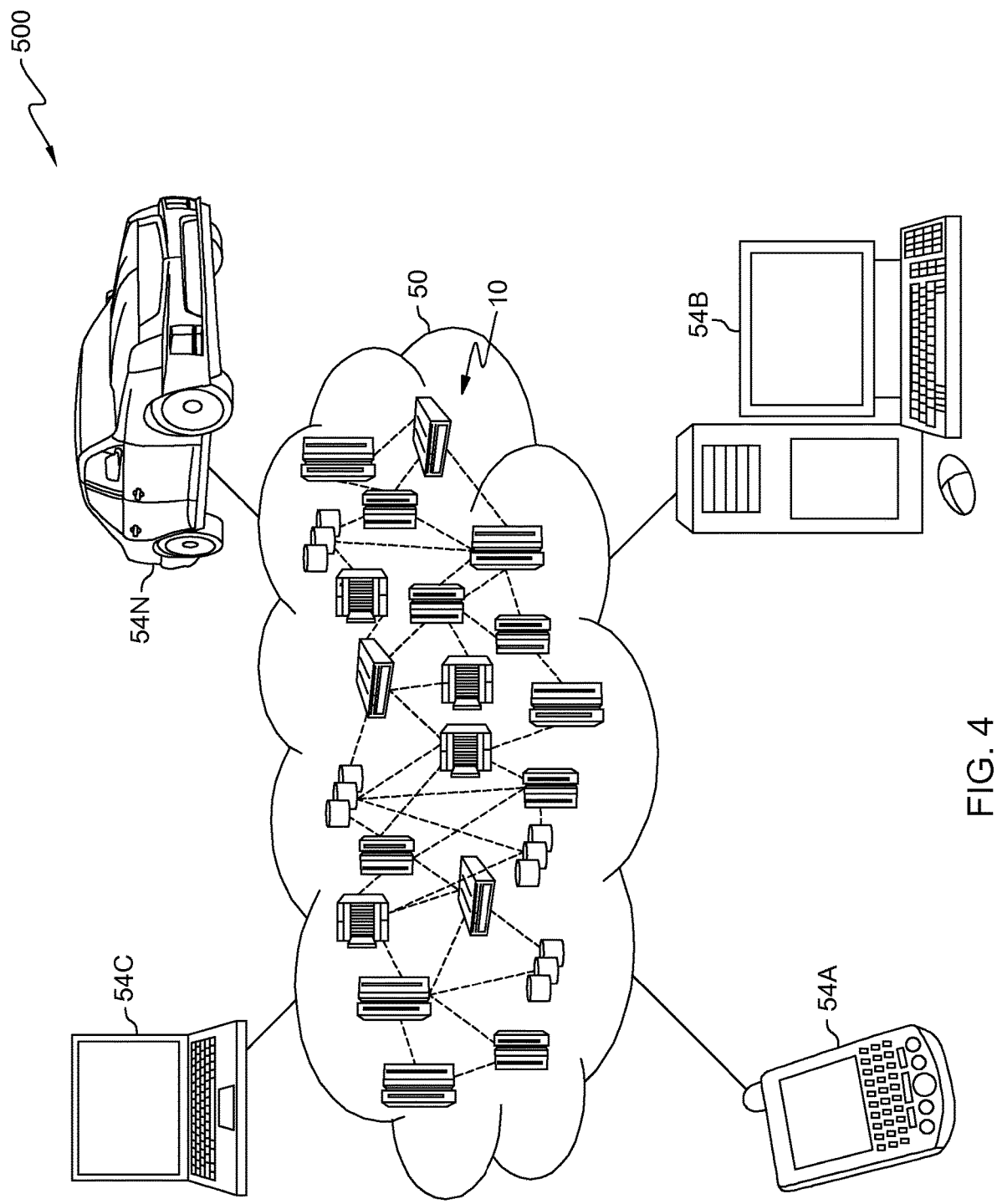
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. In an embodiment, server computer 108 may be one instance of nodes 10. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
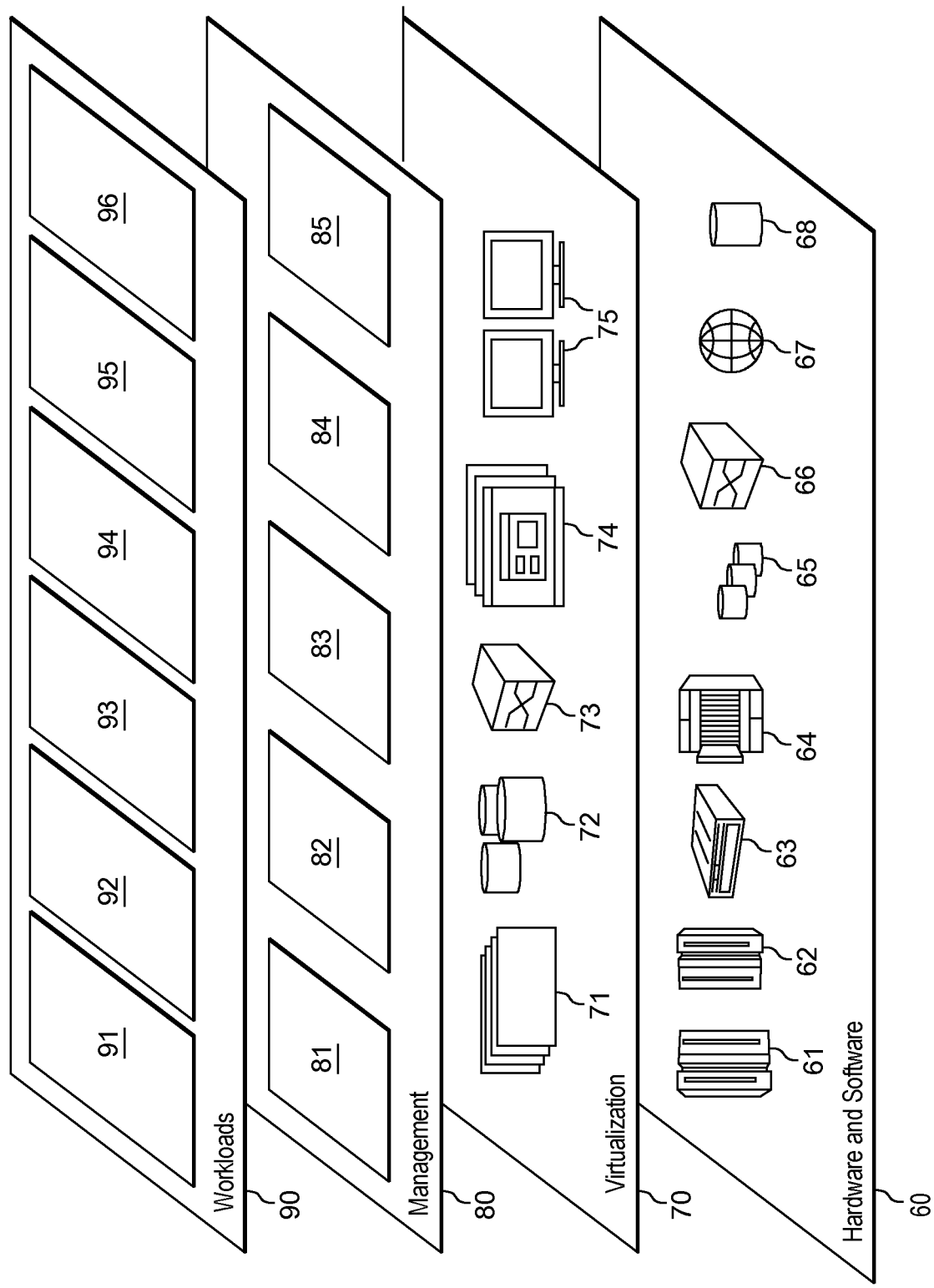
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; 3D manufacturing processing 96; and maker management program 110.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamic manufacturing, the method comprising:
   receiving, by one or more computer processors, an indication of intent to purchase a product by a user;
   identifying, by the one or more computer processors, a set of specifications associated with the product;
   calculating, by the one or more computer processors, one or more points of microscopic failure and one or more points of macroscopic failure associated with the identified set of specifications;
   identifying, by the one or more computer processors, one or more expected uses of the product based on the identified set of specifications;
   determining, by the one or more computer processors, one or more required specification parameters based on the calculated one or more points of microscopic and one or more points of macroscopic failure;
   modifying, by the one or more computer processors, the set of specifications based on the identified one or more expected uses of the product and the determined one or more required specification parameters;
   providing, by one or more computer processors, the user with a modified product to purchase based on the modified set of specifications;
   identifying, by the one or more computer processors, one or more three dimensional printing-based manufacturers within a threshold proximity to a delivery location of the product;
   determining, by the one or more computer processors, whether the one or more identified three dimensional printing-based manufacturers can create the product meeting the modified set of specifications; and
   sending, by the one or more computer processors, a list of one or more three dimensional printing-based manufacturers that can create the product based on the modified set of specifications.

2. The method of claim 1, wherein determining whether the one or more identified three dimensional printing-based manufacturers can create the product based upon the determined one or more required product specification parameters associated with the intent to purchase a product from a user is determined using cognitive computing.

3. The method of claim 1, wherein the identified set of specifications for a product is selected from a group consisting of: a three dimensional blueprint of the requested product, a type of three dimensional printing employed for the requested product, a curing time for a material, a light intensity for light based processes, dots per inch for layering processes, and layer thickness.

4. The method of claim 1, wherein the one or more required product specification parameters based on the one or more identified intended uses of the product and the identified set of specifications associated with the product are selected from a group consisting of: one or more combinations of materials, one or more product dimensions, and one or more three dimensional printing processes that satisfy the fabrication request.

5. The method of claim 1, wherein the list of one or more three dimensional printing-based manufacturers that can create the product based on the determined one or more required specification parameters includes information selected from a group consisting of: a compensation amount, one or more three dimensional printing techniques, one or more materials, a shipping method, and a shipping time.

6. The method of claim 1, wherein the threshold proximity to the location of the indication of intent to purchase the product from the user is determined using a time-dependent route planning algorithm.

7. The method of claim 1, wherein the one or more identified three dimensional printing-based manufacturers can create the product meeting the modified set of specifications is determined by executing a material failure analysis based on the one or more intended uses of the product.

8. A computer program product for dynamic manufacturing, the computer program product comprising:
   one or more computer readable storage devices and program instructions stored on the one or more computer readable storage devices, the stored program instructions comprising:
   program instructions to receive an indication of intent to purchase a product by a user;
   program instructions to identify a set of specifications associated with the product;

program instructions to calculate one or more points of microscopic failure and one or more points of macroscopic failure associated with the identified set of specifications;

program instructions to identify one or more expected uses of the product based on the identified set of specifications;

program instructions to determine one or more required specification parameters based on the calculated one or more points of microscopic and one or more points of macroscopic failure;

program instructions to modify the set of specifications based on the identified one or more expected uses of the product and the determined one or more required specification parameters;

program instructions to provide the user with a modified product to purchase based on the modified set of specifications;

program instructions to identify one or more three dimensional printing-based manufacturers within a threshold proximity to a delivery location of the product;

program instructions to determine whether the one or more identified three dimensional printing-based manufacturers can create the product meeting the modified set of specifications; and program instructions to send a list of one or more three dimensional printing-based manufacturers that can create the product based on the modified set of specifications.

9. The computer program product of claim 8, wherein determining whether the one or more identified three dimensional printing-based manufacturers can create the product based upon the determined one or more required product specification parameters associated with the intent to purchase a product from a user is determined using cognitive computing.

10. The computer program product of claim 8, wherein the identified set of specifications for a product is selected from a group consisting of: a three dimensional blueprint of the requested product, a type of three dimensional printing employed for the requested product, a curing time for a material, a light intensity for light based processes, dots per inch for layering processes, and layer thickness.

11. The computer program product of claim 8, wherein the one or more required product specification parameters based on the one or more identified intended uses of the product and the identified set of specifications associated with the product are selected from a group consisting of: one or more combinations of materials, one or more product dimensions, and one or more three dimensional printing processes that satisfy the fabrication request.

12. The computer program product of claim 8, wherein the list of one or more three dimensional printing-based manufacturers that can create the product based on the determined one or more required specification parameters includes information selected from a group consisting of: a compensation amount, one or more three dimensional printing techniques, one or more materials, a shipping method, and a shipping time.

13. The computer program product of claim 8, wherein the threshold proximity to the location of the indication of intent to purchase the product from the user is determined using a time-dependent route planning algorithm.

14. The computer program product of claim 8, wherein the one or more identified three dimensional printing-based manufacturers can create the product meeting the determined set of specifications is determined by executing a material failure analysis based on the one or more intended uses of the product.

15. A computer system for dynamic manufacturing, the computer system comprising:
one or more computer processors;
one or more computer readable storage devices;
program instructions stored on the one or more computer readable storage devices for execution by at least one of the one or more computer processors, the stored program instructions comprising:

program instructions to receive an indication of intent to purchase a product by a user;

program instructions to identify a set of specifications associated with the product;

program instructions to calculate one or more points of microscopic failure and one or more points of macroscopic failure associated with the identified set of specifications;

program instructions to identify one or more expected uses of the product based on the identified set of specifications;

program instructions to determine one or more required specification parameters based on the calculated one or more points of microscopic and one or more points of macroscopic failure;

program instructions to modify the set of specifications based on the identified one or more expected uses of the product and the determined one or more required specification parameters;

program instructions to provide the user with a modified product to purchase based on the modified set of specifications;

program instructions to identify one or more three dimensional printing-based manufacturers within a threshold proximity to a delivery location of the product;

program instructions to determine whether the one or more identified three dimensional printing-based manufacturers can create the product meeting the modified set of specifications; and program instructions to send a list of one or more three dimensional printing-based manufacturers that can create the product based on the modified set of specifications.

16. The computer system of claim 15, wherein determining whether the one or more identified three dimensional printing-based manufacturers can create the product based upon the determined one or more required product specification parameters associated with the intent to purchase a product from a user is determined using cognitive computing.

17. The computer system of claim 15, wherein the identified set of specifications for a product is selected from a group consisting of: a three dimensional blueprint of the requested product, a type of three dimensional printing employed for the requested product, a curing time for a material, a light intensity for light based processes, dots per inch for layering processes, and layer thickness.

* * * * *